United States Patent
Johns et al.

(10) Patent No.: US 11,411,280 B2
(45) Date of Patent: Aug. 9, 2022

(54) ABSORBENT GLASS MAT BATTERY

(71) Applicants: CPS Technology Holdings LLC, New York, NY (US); Clarios Germany GmbH & Co. KGaA, Hannover (DE)

(72) Inventors: Frank-Thomas Johns, Wunstorf (DE); Uwe Bitomsky, Niedersachsen (DE); Andreas Dudenbostel, Neustadt am Rbge. (DE); Matthew A. Spence, Lindenhurst, IL (US); Kavi G. Loganathan, Glendale, WI (US); Qingfang Shi, Brookfield, WI (US); Cornelia Brendel, Wunstorf (DE)

(73) Assignees: CPS Technology Holdings LLC, New York, NY (US); Clarios Germany GmbH & Co. KG, Hannover (DE)

( * ) Notice: Subject to any disclaimer, the term of this patent is extended or adjusted under 35 U.S.C. 154(b) by 84 days.

(21) Appl. No.: 16/620,299

(22) PCT Filed: Jun. 8, 2018

(86) PCT No.: PCT/US2018/036767
§ 371 (c)(1),
(2) Date: Dec. 6, 2019

(87) PCT Pub. No.: WO2018/227162
PCT Pub. Date: Dec. 13, 2018

(65) Prior Publication Data
US 2020/0106070 A1    Apr. 2, 2020

Related U.S. Application Data

(60) Provisional application No. 62/517,737, filed on Jun. 9, 2017, provisional application No. 62/530,718, filed
(Continued)

(51) Int. Cl.
*H01M 4/00* (2006.01)
*H01M 50/44* (2021.01)
(Continued)

(52) U.S. Cl.
CPC ............. *H01M 50/44* (2021.01); *H01M 4/14* (2013.01); *H01M 4/5825* (2013.01);
(Continued)

(58) Field of Classification Search
CPC ............... H01M 50/431; H01M 50/44; H01M 2220/20; H01M 4/73; H01M 4/14
See application file for complete search history.

(56) References Cited

U.S. PATENT DOCUMENTS

| 1,408,579 A | 3/1922 | Garrett |
| 2,203,797 A | 6/1940 | Pearson |

(Continued)

FOREIGN PATENT DOCUMENTS

| CA | 2090817 A1 | 2/1994 |
| CN | 2622872 Y | 6/2004 |

(Continued)

OTHER PUBLICATIONS

Zhang et al., "CyclicVoltammetric Studies of theBehavior of Lead-Silver Anodes in Zinc Electrolytes," Journal of Materials Engineering and Performance, vol. 22 No. 6, Jun. 1, 2013, pp. 1672-1679.
(Continued)

*Primary Examiner* — Cynthia H Kelly
*Assistant Examiner* — Monique M Wills
(74) *Attorney, Agent, or Firm* — Boardman & Clark LLP

(57) ABSTRACT

A lead-acid battery is disclosed. The lead-acid storage battery has a container with a cover, the container including one or more compartments. One or more cell elements are provided in the one or more compartments. The one or more cell elements include a positive plate, the positive plate
(Continued)

having a positive grid and a positive electrochemically active material on the positive grid; a negative plate, the negative plate having a negative grid and a negative electrochemically active material on the negative grid, wherein the negative electrochemically active material comprises barium sulfate and an organic expander; and a separator between the positive plate and the negative plate. Electrolyte is provided within the container. One or more terminal posts extend from the cover and are electrically coupled to the one or more cell elements.

20 Claims, 11 Drawing Sheets

Related U.S. Application Data on Jul. 10, 2017, provisional application No. 62/584,499, filed on Nov. 10, 2017, provisional application No. 62/661,444, filed on Apr. 23, 2018.

(51) Int. Cl.
| | |
|---|---|
| *H01M 4/14* | (2006.01) |
| *H01M 4/58* | (2010.01) |
| *H01M 4/62* | (2006.01) |
| *H01M 4/73* | (2006.01) |
| *H01M 10/08* | (2006.01) |
| *H01M 50/431* | (2021.01) |
| *H01M 50/543* | (2021.01) |
| *H01M 4/02* | (2006.01) |

(52) U.S. Cl.
CPC ........... *H01M 4/625* (2013.01); *H01M 4/627* (2013.01); *H01M 4/73* (2013.01); *H01M 10/08* (2013.01); *H01M 50/431* (2021.01); *H01M 50/543* (2021.01); *H01M 2004/027* (2013.01); *H01M 2220/20* (2013.01); *H01M 2300/0011* (2013.01)

(56) References Cited

U.S. PATENT DOCUMENTS

| | | |
|---|---|---|
| 3,546,023 A | 12/1970 | Halter et al. |
| 3,860,453 A | 1/1975 | Schmidt |
| 3,862,861 A | 1/1975 | McClelland et al. |
| 3,871,924 A | 3/1975 | DeMattie et al. |
| 3,944,432 A | 3/1976 | Brinkmann et al. |
| 3,994,749 A | 11/1976 | Decker et al. |
| 4,029,855 A | 6/1977 | Dougherty et al. |
| 4,031,293 A | 6/1977 | Voss et al. |
| 4,052,534 A | 10/1977 | Devitt |
| 4,121,017 A | 10/1978 | Dougherty et al. |
| 4,169,192 A | 9/1979 | Clague et al. |
| 4,238,557 A | 12/1980 | Schulte et al. |
| 4,271,241 A | 6/1981 | Hooke et al. |
| 4,327,890 A | 5/1982 | Cattano |
| 4,328,290 A | 5/1982 | Szymborski et al. |
| 4,346,151 A | 8/1982 | Uba et al. |
| 4,347,294 A | 8/1982 | Mejia |
| 4,376,156 A | 3/1983 | Wheadon |
| 4,383,011 A | 5/1983 | McClelland et al. |
| 4,399,607 A | 8/1983 | May |
| 4,444,853 A | 4/1984 | Halsall et al. |
| 4,448,862 A | 5/1984 | Schulte et al. |
| 4,504,556 A | 3/1985 | Pearson |
| 4,521,498 A | 6/1985 | Juergens |
| 4,573,514 A | 3/1986 | Wolf et al. |
| 4,576,879 A | 3/1986 | Nakazawa et al. |
| 4,606,982 A | 8/1986 | Nelson et al. |
| 4,613,550 A | 9/1986 | Jergl et al. |
| 4,648,177 A | 3/1987 | Uba et al. |
| 4,724,190 A | 2/1988 | Siga et al. |
| 4,729,933 A | 3/1988 | Oswald |
| 4,742,611 A | 5/1988 | Meadows et al. |
| 4,780,378 A | 10/1988 | McCartney, Jr. et al. |
| 4,780,379 A | 10/1988 | Puester |
| D299,639 S | 1/1989 | Anderson et al. |
| 4,800,142 A | 1/1989 | Bish et al. |
| 4,857,422 A | 8/1989 | Stocchiero |
| 4,883,728 A | 11/1989 | Witehira |
| 4,891,270 A | 1/1990 | Jergl et al. |
| 5,001,022 A | 3/1991 | Wheadon |
| 5,004,129 A | 4/1991 | Loch et al. |
| 5,091,273 A | 2/1992 | Hug et al. |
| 5,139,902 A | 8/1992 | Drews et al. |
| 5,206,987 A | 5/1993 | Mix |
| 5,223,352 A | 6/1993 | Pitts et al. |
| 5,258,243 A | 11/1993 | Cannone |
| 5,278,002 A | 1/1994 | Hiers |
| 5,284,720 A | 2/1994 | Thuerk et al. |
| 5,492,779 A | 2/1996 | Ronning |
| 5,510,203 A | 4/1996 | Hamada et al. |
| 5,527,642 A | 6/1996 | Meadows et al. |
| 5,554,455 A | 9/1996 | Inoue et al. |
| 5,580,677 A | 12/1996 | Morishita et al. |
| 5,582,936 A | 12/1996 | Mrotek et al. |
| 5,599,641 A | 2/1997 | Ching, Jr. et al. |
| 5,637,419 A | 6/1997 | Hooke et al. |
| 5,686,202 A | 11/1997 | Hooke et al. |
| 5,856,037 A | 1/1999 | Casale et al. |
| RE36,102 E | 2/1999 | Dougherty |
| 5,871,862 A | 2/1999 | Olson |
| 5,981,099 A | 11/1999 | Bourbeau |
| 6,023,146 A | 2/2000 | Casale et al. |
| 6,025,086 A | 2/2000 | Ching |
| 6,033,800 A | 3/2000 | Ichiyanagi et al. |
| 6,068,945 A | 5/2000 | Moll |
| 6,090,502 A | 7/2000 | Ingram et al. |
| 6,110,617 A | 8/2000 | Feres |
| 6,153,335 A | 11/2000 | Vutetakis et al. |
| 6,218,045 B1 | 4/2001 | Ide et al. |
| 6,228,537 B1 | 5/2001 | Richter et al. |
| 6,232,017 B1 | 5/2001 | Tsuchida et al. |
| 6,232,018 B1 | 5/2001 | Zhao |
| 6,255,013 B1 | 7/2001 | Marukawa et al. |
| 6,300,005 B1 | 10/2001 | Kump |
| 6,316,148 B1 | 11/2001 | Timmons et al. |
| 6,367,131 B1 | 4/2002 | Omae et al. |
| 6,368,741 B1 | 4/2002 | Hackel et al. |
| 6,376,119 B1 | 4/2002 | Nann et al. |
| 6,461,758 B1 | 10/2002 | Geibl et al. |
| 6,468,318 B1 | 10/2002 | Meadows et al. |
| 6,524,747 B2 | 2/2003 | Holden et al. |
| 6,528,202 B1 | 3/2003 | Arai et al. |
| 6,572,999 B1 | 6/2003 | Stocchiero |
| 6,579,640 B1 | 6/2003 | Nagase et al. |
| 6,593,027 B1 | 7/2003 | Osterhart et al. |
| 6,635,380 B1 | 10/2003 | Shimoda et al. |
| 6,709,783 B2 | 3/2004 | Ogata et al. |
| 6,761,992 B1 | 7/2004 | Marukawa et al. |
| 6,844,104 B2 | 1/2005 | Cramer et al. |
| 6,864,013 B2 | 3/2005 | Gow et al. |
| 6,881,513 B2 | 4/2005 | Dasgupta et al. |
| 6,893,777 B2 | 5/2005 | Probst |
| 6,926,882 B2 | 8/2005 | Carter |
| 6,949,310 B2 | 9/2005 | Phillips |
| 7,037,620 B2 | 5/2006 | Aronsson |
| 7,105,252 B2 | 9/2006 | Kelley et al. |
| 7,332,243 B2 | 2/2008 | Cummins |
| 7,547,487 B1 | 6/2009 | Smith et al. |
| D600,202 S | 9/2009 | Mack |
| D625,254 S | 10/2010 | Mack et al. |
| 7,879,485 B2 | 2/2011 | Yoon et al. |
| D635,509 S | 4/2011 | Mack et al. |
| 7,951,474 B2 | 5/2011 | Schembri et al. |
| 7,951,475 B2 | 5/2011 | Imhof et al. |
| D643,811 S | 8/2011 | Qualls et al. |
| 8,003,242 B2 | 8/2011 | Puhlick et al. |
| D665,342 S | 8/2012 | Qualls, Jr. et al. |
| 8,399,134 B2 | 3/2013 | Kelley et al. |
| 8,420,245 B2 | 4/2013 | Im et al. |

(56) References Cited

U.S. PATENT DOCUMENTS

| | | |
|---|---|---|
| 8,528,773 B2 | 9/2013 | Streuer |
| 8,586,248 B2 | 11/2013 | Mack et al. |
| 8,617,747 B2 | 12/2013 | Kelley et al. |
| 8,663,824 B1 | 3/2014 | Frey et al. |
| 8,709,663 B2 | 4/2014 | Wang |
| 8,722,241 B2 | 5/2014 | Mizuta et al. |
| 8,729,851 B2 | 5/2014 | Bobbin et al. |
| 8,822,063 B2 | 9/2014 | Oldenburg et al. |
| 8,846,252 B2 | 9/2014 | Wetzel et al. |
| 8,883,336 B2 | 11/2014 | Kim et al. |
| 8,883,353 B2 | 11/2014 | Streuer |
| 8,956,747 B2 | 2/2015 | Itoi et al. |
| 8,960,320 B2 | 2/2015 | Moyer |
| 8,980,419 B2 | 3/2015 | Kao et al. |
| 8,980,455 B2 | 3/2015 | Guo |
| 8,993,151 B2 | 3/2015 | Mack |
| 8,993,161 B2 | 3/2015 | Bosnyak et al. |
| 9,048,483 B2 | 6/2015 | Nakamura et al. |
| 9,093,689 B2 | 7/2015 | Mack |
| D742,307 S | 11/2015 | DeKeuster et al. |
| 9,203,116 B2 | 12/2015 | Lam et al. |
| 9,263,713 B2 | 2/2016 | Kim |
| 9,299,980 B2 | 3/2016 | Volberding et al. |
| 9,353,879 B2 | 5/2016 | Jones et al. |
| D760,160 S | 6/2016 | DeKeuster et al. |
| 9,368,800 B2 | 6/2016 | Harker et al. |
| 9,379,365 B2 | 6/2016 | Schmieder et al. |
| 9,379,378 B2 | 6/2016 | Ross et al. |
| 9,397,364 B2 | 7/2016 | Miyazaki et al. |
| 9,399,719 B2 | 7/2016 | Everill et al. |
| 9,413,001 B2 | 8/2016 | Zimrin et al. |
| 9,461,287 B2 | 10/2016 | Doyle |
| 9,496,588 B2 | 11/2016 | Nguyen et al. |
| 9,525,177 B2 | 12/2016 | Sturgeon et al. |
| 9,614,210 B2 | 4/2017 | DeKeuster et al. |
| 9,620,764 B2 | 4/2017 | DeKeuster |
| 9,748,578 B2 | 8/2017 | Mack et al. |
| 9,786,900 B2 | 10/2017 | Meissner |
| 9,812,703 B2 | 11/2017 | Furukawa et al. |
| D830,965 S | 10/2018 | Varatharajah et al. |
| 10,581,046 B2 | 3/2020 | Johns |
| 2002/0094473 A1 | 7/2002 | Lin |
| 2002/0177035 A1 | 11/2002 | Oweis et al. |
| 2002/0182487 A1 | 12/2002 | Wirtz |
| 2003/0003354 A1 | 1/2003 | Ferreira et al. |
| 2003/0072997 A1 | 4/2003 | Estreich et al. |
| 2004/0185339 A1 | 9/2004 | Jones |
| 2004/0247995 A1 | 12/2004 | Devitt |
| 2005/0147874 A1 | 7/2005 | Andersen et al. |
| 2005/0164091 A1 | 7/2005 | Schaeffer et al. |
| 2005/0238952 A1 | 10/2005 | Prengaman |
| 2006/0121353 A1 | 6/2006 | Jang |
| 2006/0141342 A1 | 6/2006 | Marconi et al. |
| 2006/0216595 A1 | 9/2006 | Holliday et al. |
| 2006/0269801 A1 | 11/2006 | Honbo et al. |
| 2007/0148542 A1 | 6/2007 | Szymborski et al. |
| 2007/0184349 A1 | 8/2007 | Yasuda |
| 2008/0131763 A1 | 6/2008 | Buiel et al. |
| 2009/0061290 A1 | 3/2009 | Anzai et al. |
| 2011/0143184 A1 | 6/2011 | McCarthy |
| 2011/0262782 A1 | 10/2011 | Zhu et al. |
| 2011/0311876 A1 | 12/2011 | Sturgeon et al. |
| 2012/0248383 A1 | 10/2012 | Atanassova |
| 2012/0251876 A1 | 10/2012 | Jagannathan |
| 2012/0308888 A1 | 12/2012 | Johns |
| 2013/0022860 A1 | 1/2013 | Minoura et al. |
| 2013/0029210 A1 | 1/2013 | Minoura et al. |
| 2013/0071708 A1 | 3/2013 | Delans |
| 2013/0115509 A1 | 5/2013 | Taylor et al. |
| 2013/0145613 A1 | 6/2013 | Wang et al. |
| 2013/0157118 A1* | 6/2013 | Shibahara ............. H01M 4/625 429/163 |
| 2013/0202926 A1 | 8/2013 | Yoon |
| 2013/0207459 A1 | 8/2013 | Schroder et al. |
| 2013/0302656 A1 | 11/2013 | Partington et al. |
| 2014/0050986 A1 | 2/2014 | Dhar |
| 2014/0093775 A1 | 4/2014 | Hardman |
| 2014/0120386 A1 | 5/2014 | Jagannathan et al. |
| 2014/0127587 A1 | 5/2014 | Mack |
| 2014/0186712 A1 | 7/2014 | Albano et al. |
| 2014/0212784 A1 | 7/2014 | Fujita et al. |
| 2014/0227585 A1* | 8/2014 | Wertz ............... H01M 10/4235 429/163 |
| 2014/0356727 A1 | 12/2014 | Nouzuka et al. |
| 2015/0030893 A1 | 1/2015 | Mack et al. |
| 2015/0037616 A1 | 2/2015 | Wyatt et al. |
| 2015/0050540 A1* | 2/2015 | Toduka ................. H01M 10/06 429/136 |
| 2015/0064543 A1 | 3/2015 | Jung |
| 2015/0079427 A1 | 3/2015 | Chen et al. |
| 2015/0104715 A1 | 4/2015 | Dudenbostel et al. |
| 2015/0200424 A1* | 7/2015 | Ogasawara ......... H01M 50/541 429/163 |
| 2015/0318529 A1 | 11/2015 | Whear et al. |
| 2015/0332860 A1 | 11/2015 | Yin et al. |
| 2015/0372289 A1 | 12/2015 | Korzhenko et al. |
| 2016/0093842 A1 | 3/2016 | Blanco et al. |
| 2016/0126517 A1 | 5/2016 | Koch et al. |
| 2016/0181595 A1 | 6/2016 | Reich |
| 2016/0254548 A1 | 9/2016 | Staffeldt et al. |
| 2016/0260982 A1 | 9/2016 | Koch et al. |
| 2016/0315327 A1 | 10/2016 | Ketzer et al. |
| 2016/0322642 A1 | 11/2016 | Pavlovic et al. |
| 2016/0336622 A1 | 11/2016 | Zhang |
| 2017/0025881 A1 | 1/2017 | Motoi |
| 2017/0125750 A1 | 5/2017 | Tsukiyoshi |
| 2017/0324098 A1 | 11/2017 | Mack et al. |
| 2018/0151872 A1 | 5/2018 | Zhamu et al. |
| 2019/0148783 A1* | 5/2019 | Guo ...................... H01M 10/12 429/188 |

FOREIGN PATENT DOCUMENTS

| | | |
|---|---|---|
| CN | 201820846 U | 5/2011 |
| DE | 19953417 A1 | 5/2001 |
| DE | 102010001533 A1 | 8/2011 |
| DE | 102011054775 A1 | 4/2013 |
| DE | 102013213776 A1 | 1/2015 |
| EP | 0794582 A1 | 9/1997 |
| EP | 1628354 A2 | 2/2006 |
| EP | 1055263 B1 | 4/2006 |
| EP | 1689010 B1 | 8/2008 |
| EP | 1732151 B1 | 3/2011 |
| EP | 1665446 B1 | 3/2012 |
| EP | 2377142 B1 | 8/2013 |
| EP | 2453502 B1 | 5/2014 |
| EP | 271676 B1 | 6/2015 |
| EP | 2681787 B1 | 6/2015 |
| EP | 2820692 B1 | 6/2016 |
| EP | 3139426 A2 | 3/2017 |
| EP | 2517287 B1 | 4/2017 |
| EP | 3076455 A4 | 5/2017 |
| FR | 2551172 A1 | 3/1985 |
| FR | 2681981 B1 | 12/1993 |
| GB | 2086646 A | 5/1982 |
| JP | 2974989 B2 | 11/1999 |
| JP | 2003132866 A | 5/2003 |
| JP | 3965661 B1 | 8/2007 |
| JP | 4701636 B2 | 6/2011 |
| JP | 2013058355 A | 3/2013 |
| JP | 5580567 B2 | 8/2014 |
| JP | 5591141 B2 | 9/2014 |
| JP | 5617765 B2 | 11/2014 |
| JP | 5939307 B2 | 6/2016 |
| JP | 2016126872 A | 7/2016 |
| JP | 6089984 B2 | 3/2017 |
| JP | 2017062958 A | 3/2017 |
| JP | 6127763 B2 | 5/2017 |
| WO | 9627215 A1 | 9/1996 |
| WO | 2005022680 A3 | 3/2005 |
| WO | 2008066253 A1 | 6/2008 |
| WO | 2008153977 A1 | 12/2008 |
| WO | 2010027451 A1 | 3/2010 |

(56) References Cited

FOREIGN PATENT DOCUMENTS

| WO | WO 2010/027451 A1 | 3/2010 | | |
|---|---|---|---|---|
| WO | WO-2010098796 A1 | 9/2010 | | |
| WO | 2014015451 A1 | 1/2014 | | |
| WO | 2014141279 A1 | 9/2014 | | |
| WO | WO-2014186455 A1 * | 11/2014 | ............. | H01M 4/21 |
| WO | 2015013624 A3 | 1/2015 | | |
| WO | WO-2015079668 A1 | 6/2015 | | |
| WO | 2015103304 A1 | 7/2015 | | |
| WO | 2016178219 A1 | 11/2016 | | |
| WO | 2016210107 A1 | 12/2016 | | |
| WO | 2017025961 A1 | 2/2017 | | |
| WO | 2017136545 A1 | 8/2017 | | |
| WO | 2018119242 | 6/2018 | | |
| WO | 2018140711 | 8/2018 | | |
| WO | 2018140713 | 8/2018 | | |
| WO | 2018140735 | 8/2018 | | |
| WO | 2018140776 | 8/2018 | | |
| WO | 2018224887 A1 | 12/2018 | | |
| WO | 2018227162 | 12/2018 | | |

OTHER PUBLICATIONS

International Search Report and Written Opinion of the International Searching Authority dated Sep. 6, 2018, for Appln. No. PCT/US2018/036767 filed Jun. 8, 2018, 14 pgs.

International Search Report and Written Opinion of the International Searching Authority dated Mar. 5, 2018 for PCT/US2017/067913 filed Dec. 21, 2017, 10 pages.

International Search Report and Written Opinion of the International Searching Authority dated Sep. 6, 2018, for PCT/US2018/036767 filed Jun. 8, 2018, 14 pages.

* cited by examiner

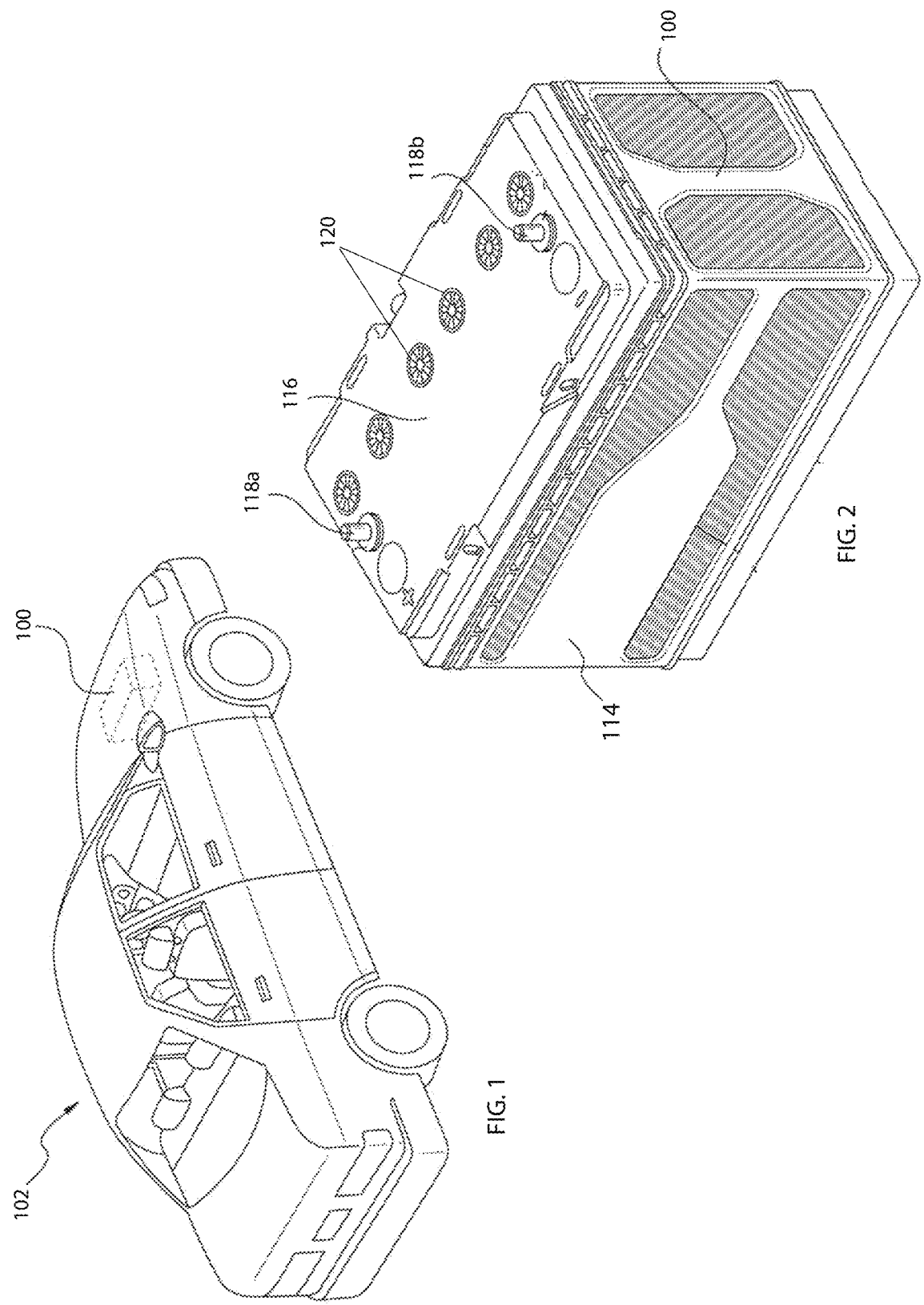

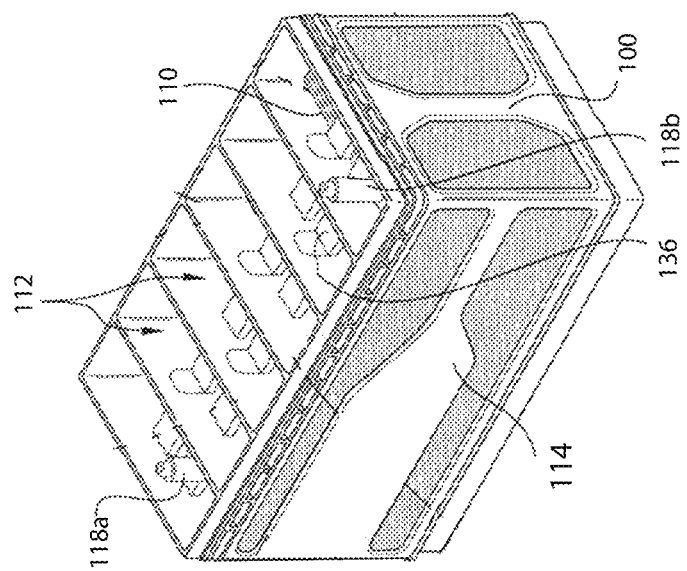

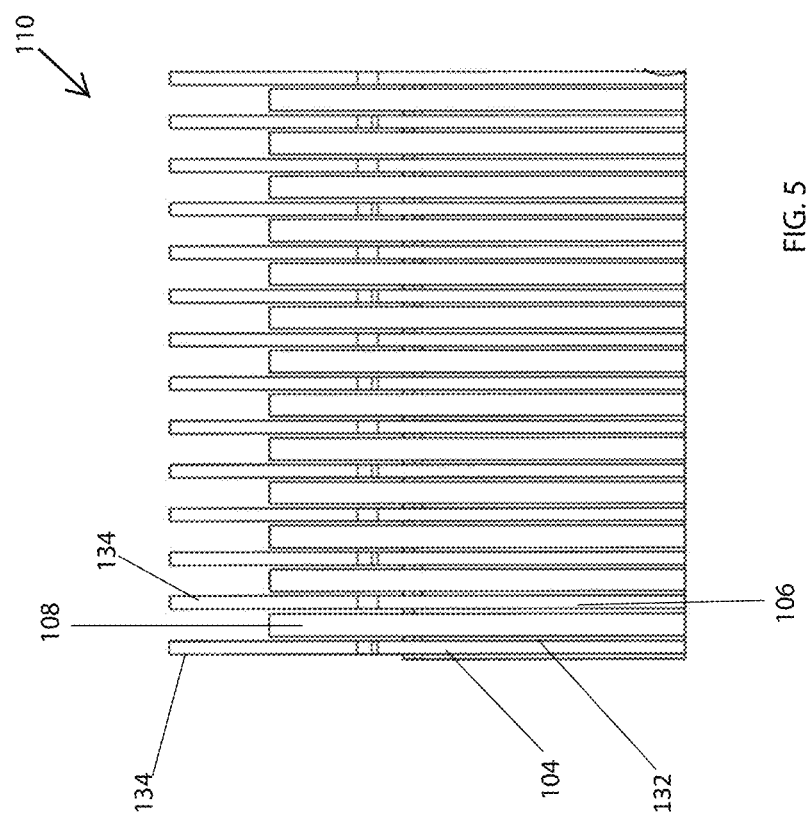

ABSORBENT GLASS MAT BATTERY

CROSS-REFERENCE TO RELATED APPLICATIONS

This application is a National Stage Entry of PCT/US2018/036767, filed Jun. 8, 2018, entitled "LEAD-ACID BATTERY", which claims priority to U.S. Provisional Patent Application, Ser. No. 62/517,737, filed Jun. 9, 2017, entitled IMPROVED ABSORBENT GLASS MAT BATTERY; U.S. Provisional Patent Application, Ser. No. 62/530,718, filed Jul. 10, 2017, entitled IMPROVED ABSORBENT GLASS MAT BATTERY, U.S. Provisional Patent Application, Ser. No. 62/584,499, filed Nov. 10, 2017, entitled IMPROVED ABSORBENT GLASS MAT BATTERY; and U.S. Provisional Patent Application, Ser. No. 62/661,444, filed Apr. 23, 2018, entitled IMPROVED ABSORBENT GLASS MAT BATTERY, the entire contents of each of which is incorporated by reference herein in its entirety.

FIELD

The present inventions relate to the field of batteries. The present inventions more specifically relate to the field of lead-acid batteries.

BACKGROUND

Lead-acid batteries are known. Lead-acid batteries are made up of plates of lead and separate plates of lead dioxide, which are submerged into an electrolyte solution. The lead, lead dioxide and electrolyte provide a chemical means of storing electrical energy which can perform useful work when the terminals of a battery are connected to an external circuit.

One type of lead-acid battery is an AGM or absorbent glass mat lead-acid battery which is a sealed (e.g., maintenance-free), or more specifically a valve regulated battery, in which the electrolyte is absorbed and retained in a mat that is wrapped around or interleaved with an electrode(s) or plate(s). AGM lead-acid batteries are recombinant batteries, that is, $H_2$ and $O_2$ generated during charging are recombined to water in the battery.

AGM lead-acid batteries are advantageous over traditional starting, lighting and ignition (SLI) batteries, in that they are better suited to providing power in a vehicle with numerous electronic features or plug-in accessories. AGM batteries are also a preferred solution for fuel saving start-stop vehicle technology.

Start-stop vehicles can place various demands on a battery. Vehicles also are increasing in the electrical load of components, for which the electrical load must be supported through a stop event. Vehicle manufacturers are seeking a cost effective, reliable energy storage solution that ensures a seamless customer experience. Therefore there is a need for consistent reliable performance from a lead-acid battery. There is also a need for a robust battery which can support additional prolonged/intermittent loads and support optimal duration and frequency of stop events. To this end, a need exists for a lead-acid battery which provides sustainable and fast rechargeability (e.g., optimized charge acceptance) and consistent cycling performance. Accordingly, a need exists for an AGM lead-acid battery with improved performance over existing devices.

SUMMARY

A lead-acid storage battery and an absorbent glass mat lead-acid storage battery are disclosed which have improved performance.

More specifically, a lead-acid battery is disclosed. The lead-acid battery has a container with a cover and includes one or more compartments. One or more cell elements are provided in the one or more compartments. Each cell element includes a positive plate, the positive plate having a positive grid and a positive electrochemically active material on the positive grid; a negative plate, the negative plate having a negative grid and a negative electrochemically active material on the negative grid, wherein the negative electrochemically active material comprises, in part, barium sulfate and an expander; and an absorbent glass mat separator between the positive plate and the negative plate. Electrolyte is provided within the container. One or more terminal posts extend from the container or the cover and are electrically coupled to the one or more cell elements.

Another lead-acid storage battery is disclosed having a container with a cover, the container including one or more compartments. One or more cell elements are provided in the one or more compartments. The one or more cell elements include a positive plate, the positive plate having a positive grid and a positive electrochemically active material on the positive grid; a negative plate, the negative plate having a negative grid and a negative electrochemically active material on the negative grid, wherein the negative electrochemically active material comprises, in part, barium sulfate and an expander; and a separator between the positive plate and the negative plate. Electrolyte is provided within the container. One or more terminal posts extend from the container or the cover and are electrically coupled to the one or more cell elements.

A further lead-acid storage battery is disclosed. The battery comprises a container with a cover, the container including one or more compartments and one or more cell elements in the one or more compartments. The one or more cell elements have a positive plate, the positive plate having a positive grid and a positive electrochemically active material on the positive grid; a negative plate, the negative plate having a negative grid and a negative electrochemically active material on the negative grid; wherein the negative electrochemically active material comprises, in part, one or more carbons (carbonaceous materials), barium sulfate, and one or more expanders; and an absorbent glass mat separator between the positive plate and the negative plate. Electrolyte is provided within the container, wherein the electrolyte comprises a sulfuric acid solution including one or more metal sulfates, wherein the metal sulfates are soluble metal sulfates selected from the group consisting of the elements Al, Mg, Na, K, Li, and Zn. One or more terminal posts extend from the container or the cover and are electrically coupled to the one or more cell elements.

These and other features and advantages of devices, systems, and methods according to this invention are described in, or are apparent from, the following detailed descriptions of various examples of embodiments.

BRIEF DESCRIPTION OF DRAWINGS

Various examples of embodiments of the systems, devices, and methods according to this invention will be described in detail, with reference to the following figures, wherein:

FIG. 1 is a perspective view of a vehicle for use with an absorbent glass mat battery according to one or more examples of embodiments described herein.

FIG. 2 is a perspective view of an absorbent glass mat battery according to one or more examples of embodiments described herein.

FIG. 3 is a perspective view of the absorbent glass mat battery shown in FIG. 2, with the cover removed.

FIG. 5 is a partial, side elevation view of a cell element according to one or more examples of embodiments for use with the absorbent glass mat battery shown in FIG. 2.

Figure 4:
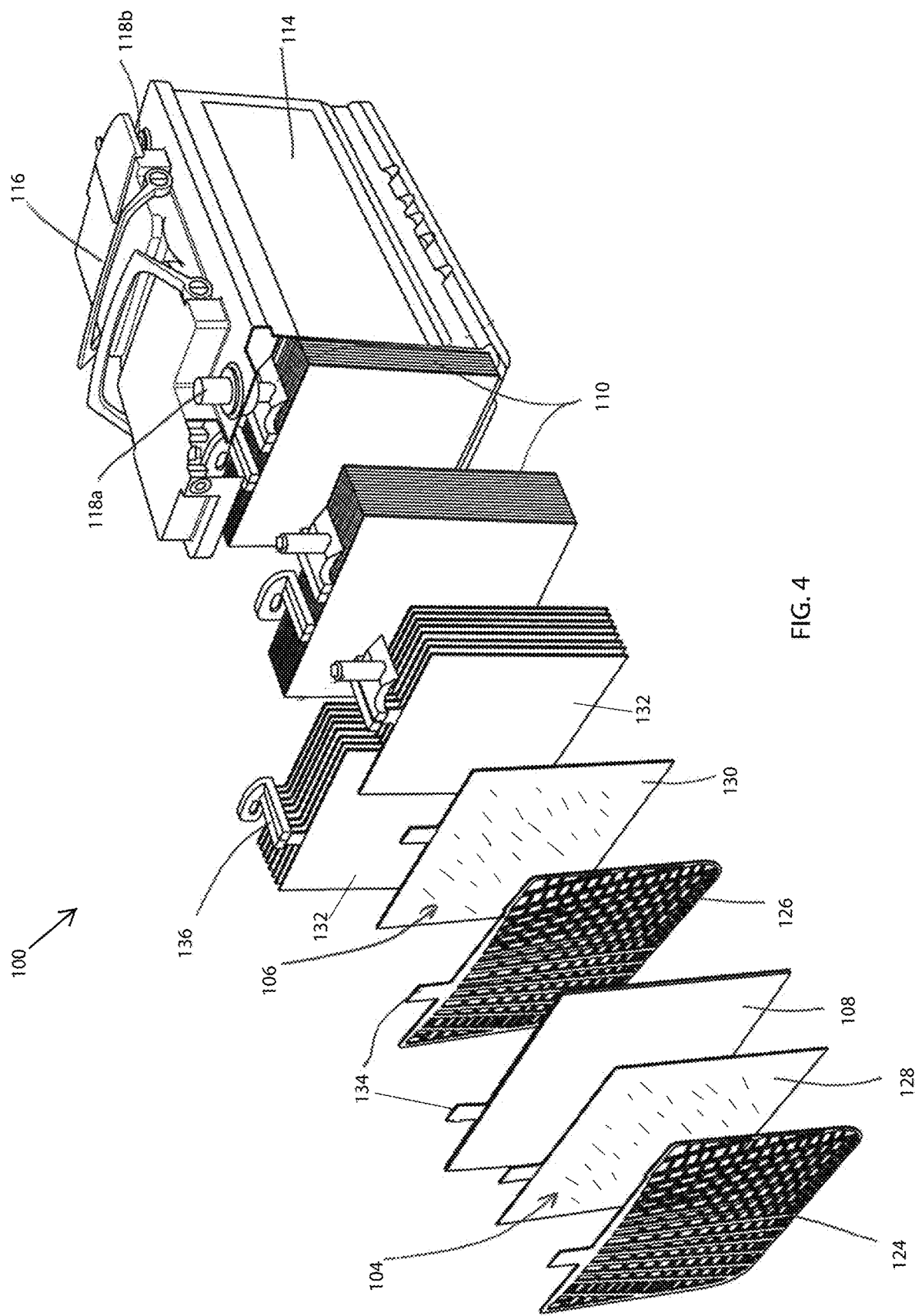
FIG. 4 is an exploded perspective view of an absorbent glass mat battery according to one or more examples of embodiments described herein.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

DETAILED DESCRIPTION

Referring to the Figures, a battery 100 is disclosed, and in particular a rechargeable battery, such as, for example, a lead-acid battery. According to one or more examples of embodiments, the battery 100 is a lead-acid storage battery. Various embodiments of lead-acid storage batteries may be either sealed (e.g., maintenance-free) or unsealed (e.g., wet). According to one or more examples of embodiments, the lead-acid storage battery 100 is preferably a sealed lead-acid battery or AGM lead-acid battery and, to this end, may include an absorbent glass mat 108 (referred to interchangeably herein as "AGM"). While specific examples are described and illustrated, the battery 100 may be any secondary battery suitable for the purposes provided.

A battery 100 is provided and shown in a vehicle 102 in FIG. 1. Referring to FIGS. 2-5, the battery 100 is an AGM lead-acid battery having positive and negative plates 104, 106 which are separated by an absorbent glass mat 108 that absorbs and holds the battery's acid or electrolyte and prevents it from flowing freely inside the battery 100. The working electrolyte saturation is at some value below 100% saturation to allow recombinant reactions of hydrogen and oxygen. The AGM lead-acid battery 100 includes several cell elements 110 which are provided in one or more separate compartments 112 of a container or housing 114. The element stack 110 may be compressed during insertion reducing the thickness of the separator 108. A cover 116 is provided for the container or housing 114 and may be sealed to the container 114. In various embodiments, the container 114 and/or cover 116 includes battery terminals 118. The battery cover 116 may also include one or more filler hole caps and/or vent assemblies 120 (see FIG. 2).

Referring to FIG. 4, the plates 104, 106 include electrically-conductive positive or negative grids 124, 126 or current collecting members. Positive paste 128 is provided on the positive grid 124 and negative paste 130 is provided on the negative grid 126. More specifically, the positive plate 104 includes a positive grid 124 having or supporting a positive active material or paste 128 thereon, and in some examples of embodiments may include a pasting paper or a woven or non-woven sheet material comprised of fibers (e.g., a "scrim") 132; and the negative plate 106 includes a negative grid 126 having or supporting a negative active material or paste 130 thereon, and in some examples of embodiments may include a pasting paper or scrim 132. Positioned between the positive and negative plates 104, 106 is a separator 108. In a retained electrolyte-type battery 100 such as described herein, the separator 108 may be a porous and absorbent glass mat (AGM). In some examples, the absorbent glass mat 108 may also be used with an additional separator (not shown); various common commercially available separators are known in the art.

A plurality of positive plates 104 and a plurality of negative plates 106 (with separators 108) generally make up at least a portion of the electrochemical cell 110 (see FIGS. 3-5). As indicated, each plate set or cell 110 may include one or more positive plates 104 and one or more negative plates 106. Thus, the battery 100 includes a positive plate 104 and a negative plate 106, and more specifically a plurality of positive plates 104 and a plurality of negative plates 106. Referring to FIGS. 3-4, a plurality of plate sets or books or cell elements 110 may be electrically connected, e.g., electrically coupled in series or other configuration, according to the capacity of the lead-acid storage battery 100. Each grid has a lug 134 (see FIGS. 4-8). In FIGS. 3-4, one or more cast-on straps or intercell connectors 136 are provided which electrically couple the lugs 134 of like polarity in a plate set or cell element 110 and to connect other respective plate sets or cell elements 110 in the battery 100. One or more positive terminal posts 118a and one or more negative terminal posts 118b (FIGS. 2-4) may also be provided. Such terminal posts 118 typically include portions which may extend through the cover and/or container wall, depending upon the battery design. It will be recognized that a variety of terminal arrangements are possible, including top, side, front or corner configurations known in the art.

A plurality of positive plates 104 and negative plates 106 may be provided in stacks or plate sets or cell elements 110 for producing a battery having a predetermined voltage, for example a 12-volt battery in a vehicle 102. The number of cell elements 110 or plate groups or plate sets may be varied. It will also be obvious to those skilled in the art after reading this specification that the size and number of plates 104 and/or 106 in any particular group (including the size and number of the individual grids), and the number of groups used to construct the battery 100 may vary depending upon the desired end use.

As described in various embodiments herein, the positive and negative plates 104, 106 are paste-type electrodes (FIG. 4). Thus, each plate 104, 106 comprises a grid 124, 126 pasted with active material 128, 130. More specifically, the paste-type electrode includes a grid which acts as a substrate and an electrochemically active material or paste is provided on the substrate. The grids, including a positive grid 124 and a negative grid 126, provide an electrical contact between the positive and negative active materials or paste 128, 130 which may serve to conduct current.

Figure 7:
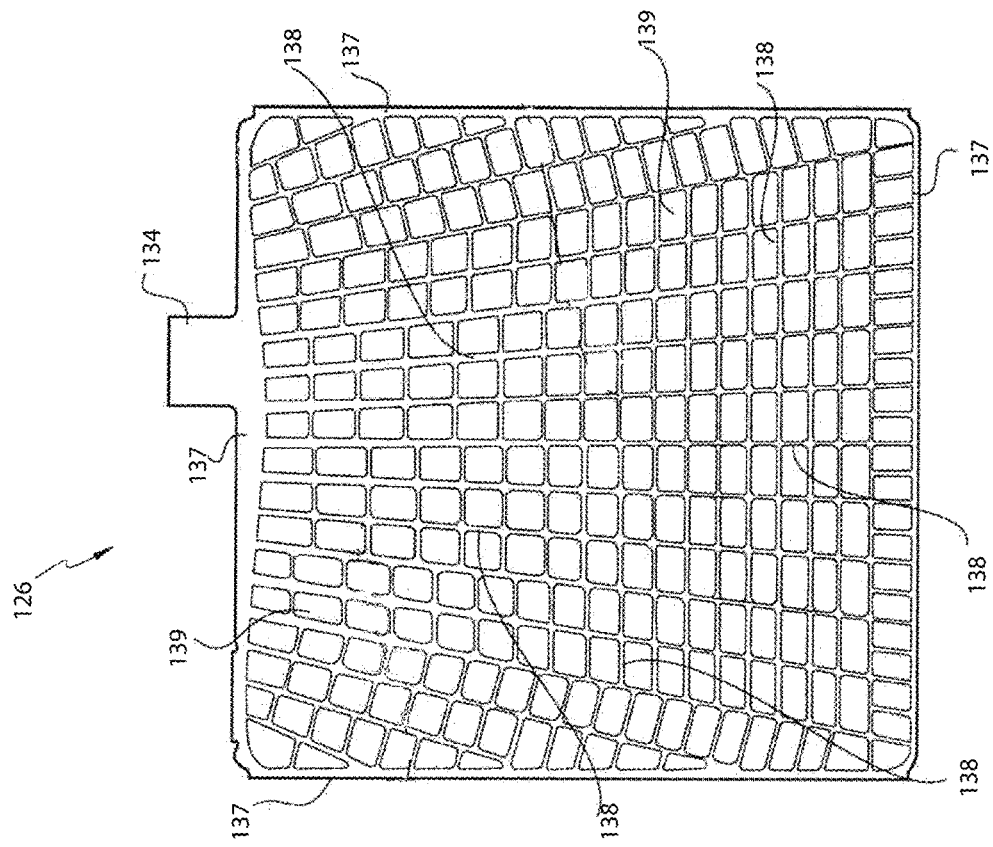
FIG. 7 is an additional elevation view of an example battery grid for use with the absorbent glass mat battery shown in FIG. 2.
Figure 6:
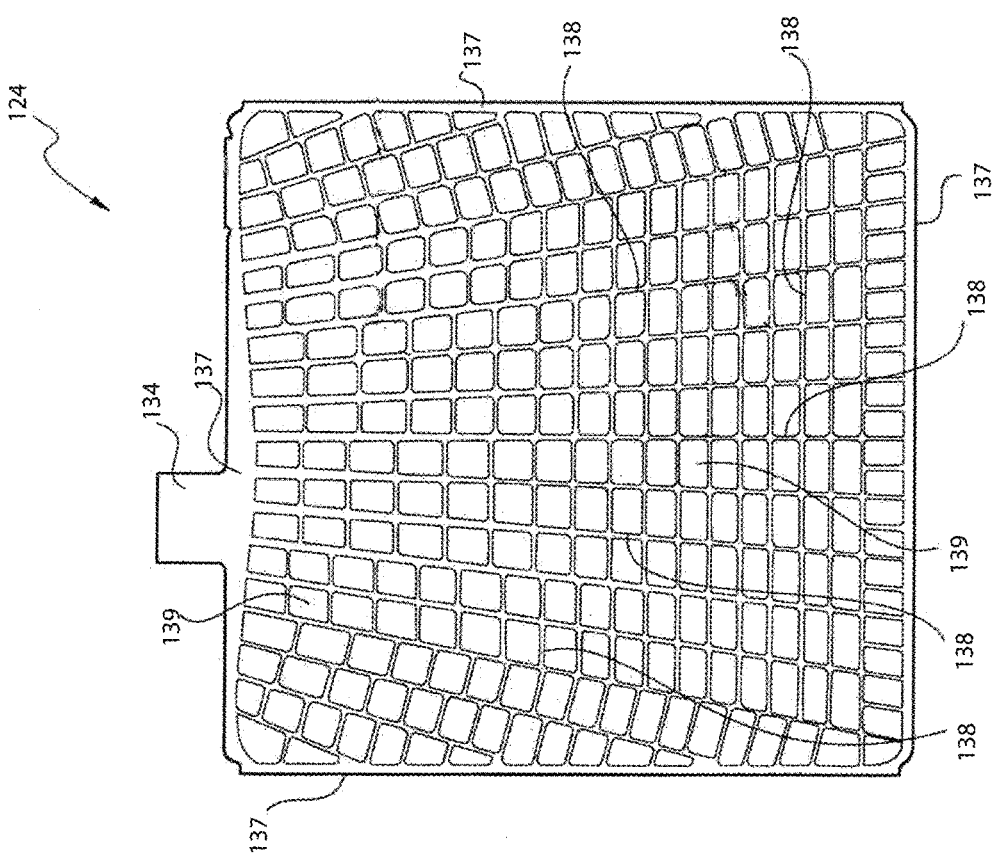
FIG. 6 is an elevation view of an example battery grid for use with the absorbent glass mat battery shown in FIG. 2.
Figure 8:
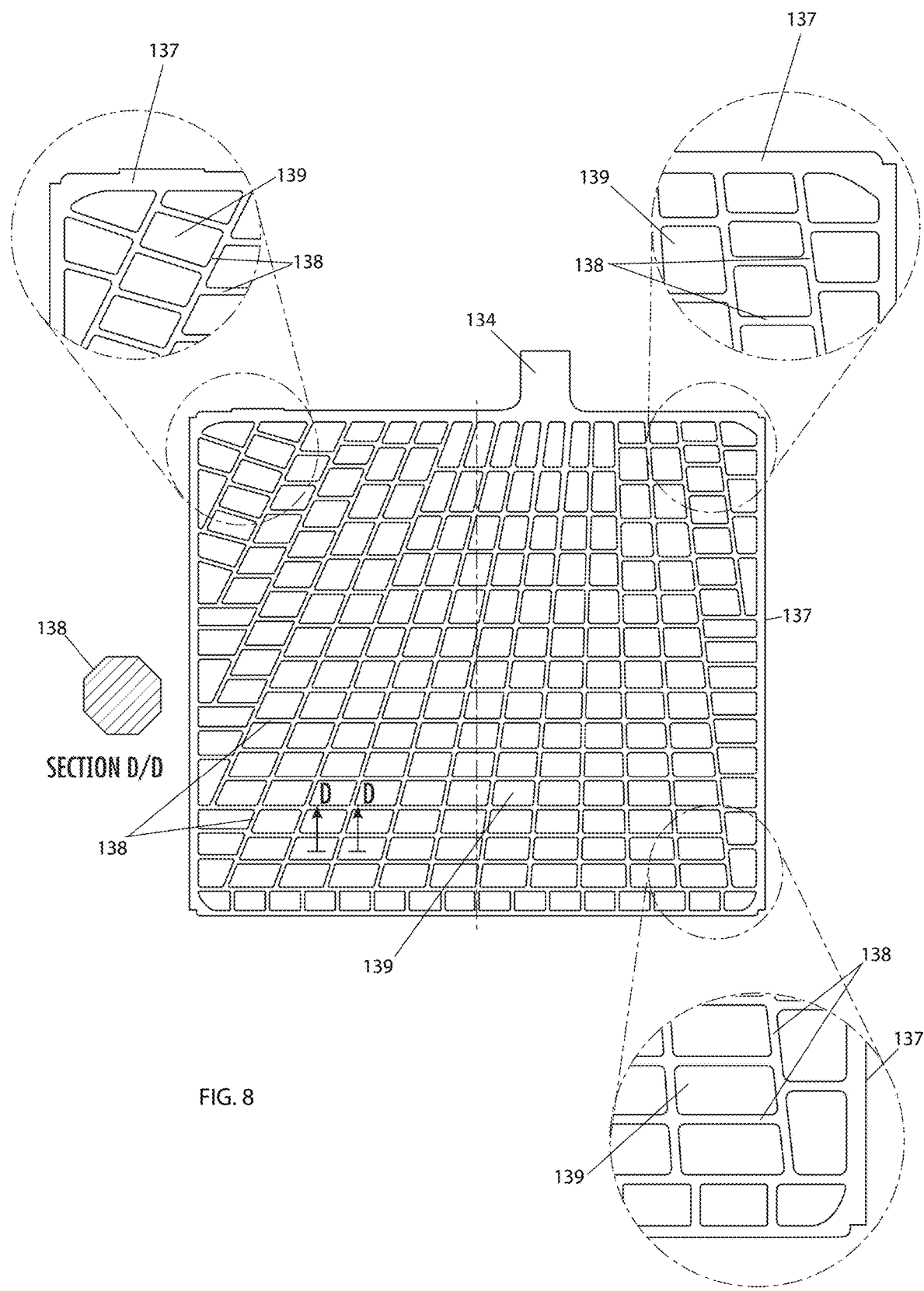
FIG. 8 is an elevation view of an alternative example battery grid for use with the absorbent glass mat battery shown in FIG. 2, showing section details of the illustrated grid.

Referring to FIGS. 6-8, in one or more examples of embodiments, the grids 124, 126 may be the same or similar. To this end, the grids 124, 126 may be stamped or punched fully framed grids having a frame 137 and a radial arrangement of grid wires 138 forming a pattern of open spaces 139. In one example, both the positive grids 124 and the negative grids 126 may have such an arrangement. However, it is contemplated that the grids 124, 126 may differ. For example, the positive grid 124 may be a stamped or punched fully framed grid having a radial arrangement of grid wires 138 and the negative grid 126 may be concast or, for example, expanded metal or gravity cast. Various examples of grids 124, 126 suitable for use with the inventions described herein are shown and described in U.S. Pat. Nos. 5,582,936; 5,989,749; 6,203,948; 6,274,274; 6,953,641 and 8,709,664, which are hereby incorporated by reference herein. While specific examples of grid wire 138 arrangements and grid types are described for purposes of example, the invention is not limited thereto and any grid structure or arrangement suitable for the purposes of the battery 100 may be substituted in place of the described grids 124, 126. For example, a negative grid 126 having a different or improved profile may be provided. In one or more examples of embodiments, a negative grid 126 having a profile similar to that shown in U.S. Pat. No. 9,130,232, which is hereby incorporated by reference herein (and also shown in FIG. 8), may be provided. In other examples of embodiments, the grid may be a punched grid, a continuously cast (concast) grid, an expanded metal grid, and so forth. In some examples of embodiments, the grid may also include surface roughening or may be subjected to one or more different surface treatments (e.g., solvent, surfactant and/or steam cleaning), such as may be used to improve paste adhesion among other benefits.

According to one or more examples of embodiments, the grid 124 material may be composed of lead (Pb) or a lead alloy (or any suitable conductive substrate, i.e. carbon fiber). The negative grid 126 may be composed of the same or similar material to the positive grid 124. It is contemplated, however, that material composition may also vary between the positive grid 124 and the negative grid 126. In one example of embodiments, the positive and negative grids 124, 126 may also be formed of different thickness. However, it is contemplated that the grids 124, 126 may be of the same thickness. The thickness of each grid may be varied based upon desired manufacturing and performance parameters. For instance, thickness may be determined based upon manufacturing requirements, such as for instance, minimum requirements for paste adhesion, or other suitable parameters. While specific examples are provided for purposes of illustration, variations thereon may be made to provide grid dimensions suitable for the particular application.

In more detail, the positive plate 104 contains a metal (e.g., lead or lead alloy) grid 124 with lead dioxide active material or paste 128 thereon. Examples of lead-containing compositions which may be employed in the positive paste 128 include, but are not limited to, finely-divided elemental Pb, PbO ("litharge" or "massicot"), $Pb_3O_4$ ("red lead"), $PbSO_4$ ("Lead sulfate" with the term "PbSO4" being defined to also include its associated hydrates, and basic sulfates: $1PbO.PbSO_4$, $3PbO.PbSO_4.H_2O$, $4PbO.PbSO_4$), and mixtures thereof. Different materials may be used in connection with the lead-containing paste composition, with the present invention not being restricted to any particular materials or mixtures (added fibers, or other constituents). These materials may be employed alone or in combination as determined by numerous factors, including for example, the intended use of the battery 100 and the other materials employed in the battery.

The negative plate 106 may be composed of a metal (e.g., lead or lead alloy) grid with a spongy lead active material or paste 130 thereon. The negative paste 130 may, in a preferred embodiment, be substantially similar to the positive paste 128 but may also vary. Example lead-containing compositions which may be employed in the negative paste 130 include but are not limited to finely-divided elemental Pb, PbO ("litharge" or "massicot"), $Pb_3O_4$ ("red lead"), $PbSO_4$ ("Lead sulfate" with the term "PbSO4" being defined to also include its associated hydrates, and basic sulfates: $1PbO.PbSO_4$, $3PbO.PbSO_4.H_2O$, $4PbO.PbSO_4$), and mixtures thereof. In addition, the negative active material 130 may also contain fiber and/or "expander" additives which may help maintain the active material structure and improve performance characteristics, among other things. Different materials may be used in connection with the lead-containing paste composition, with the present invention not being restricted to any particular materials or mixtures (added fibers, or other constituents). These materials may be employed alone or in combination as determined by numerous factors, including for example, the intended use of the battery 100 and the other materials employed in the battery.

According to one or more examples of embodiments, the active material or paste 128 and/or 130 may have an improved composition or recipe over traditional AGM batteries. Preferably, the active material composition or recipe provides a changed, or improved, charge acceptance performance and/or efficiency (e.g., dynamic charge acceptance) over existing AGM batteries while also maintaining or improving CCA (Cold Cranking Amps at −18 degrees C.) performance and cycle life performance. In some examples, the dynamic charge acceptance may be greater than 2 times the performance of existing AGM batteries. In fact, as will be discussed in greater detail below, relative to existing commercial batteries on the market today, against some current commercial batteries the battery disclosed herein may perform up to 5 times better (e.g., see FIG. 13; 0.79/0.13=5×) and against other current commercial batteries may perform at least 2 times better (e.g., see FIG. 13; 0.79/0.326=2×). The current industry average is around 0.3 A/Ah for an EN50342 DCA test. In comparison, the battery 100 disclosed herein may perform around 0.78-0.79 A/Ah with the various improvements described herein (see FIG. 13).

Figure 9:
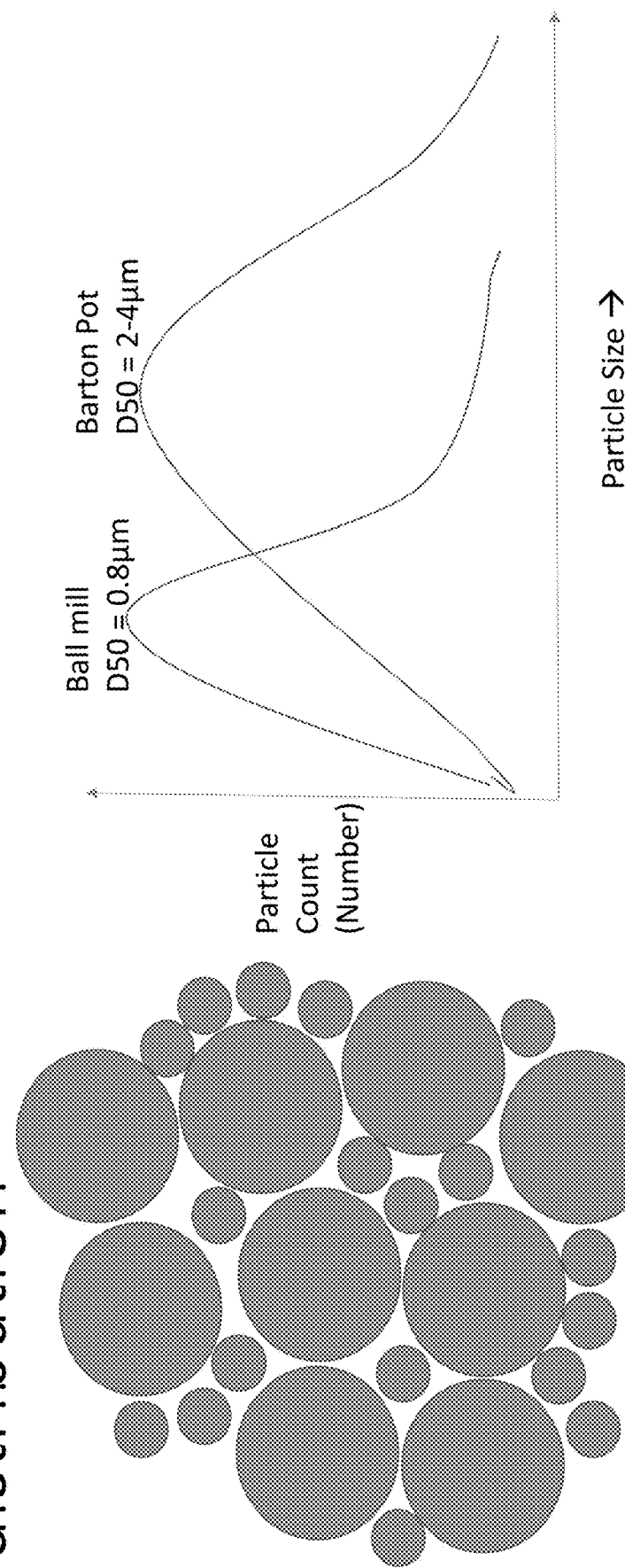
FIG. 9 is an example illustration of a bimodal particle size distribution of oxide.
Figure 10:
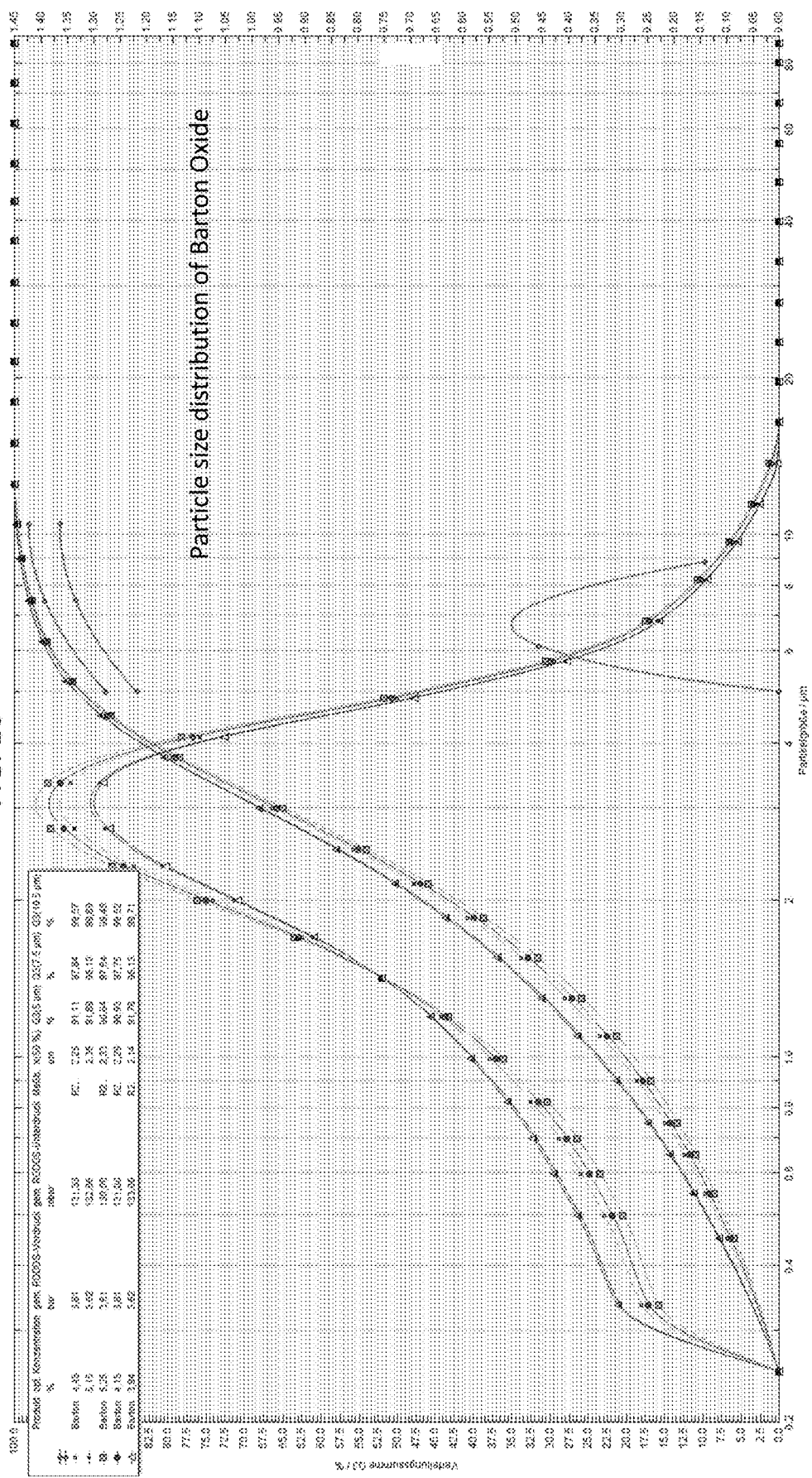
FIG. 10 is an example particle size distribution of oxide produced by Barton Pot method.
Figure 11:
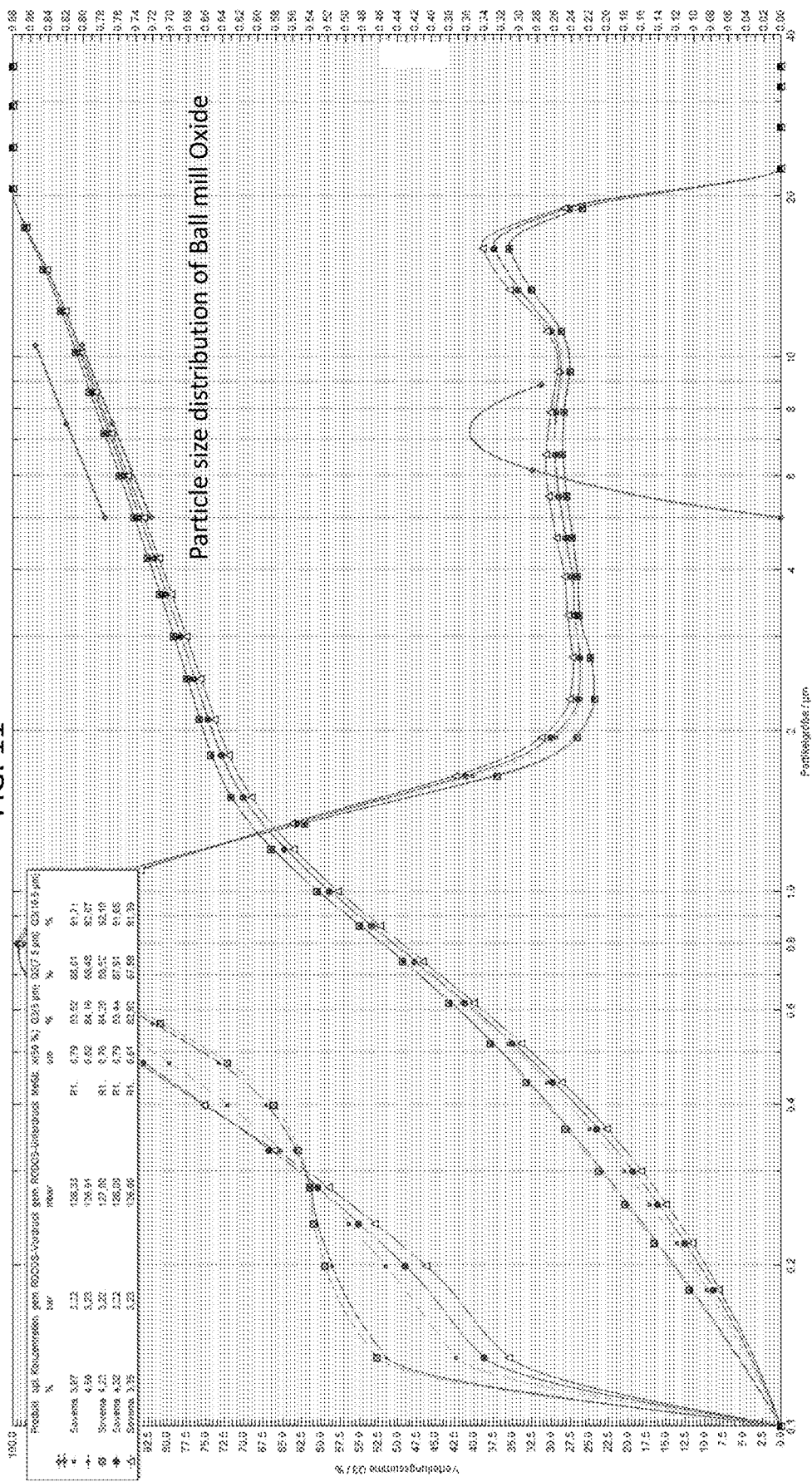
FIG. 11 is an example particle size distribution of oxide produced by Ball Mill method.

Lead oxide is used to make a paste which is spread onto the metal grids. After chemical conversion the paste becomes the active material. The lead oxide is made by reacting the pure lead metal with oxygen in the air. In various examples, the particle size distribution of the leady oxide used to make the active material pastes 128 and/or 130 may be closely controlled. That is, a specific or preferred particle size distribution may be used for the intended purposes. In some examples, the positive electrochemically active material may have a positive oxide having a bimodal particle size distribution of leady oxide (see FIG. 9). For example, the positive oxide may be composed of an oxide with a particular bimodal particle size distribution with peaks at 0.87-1.2 um and 2.0-4.0 um oxide, for example. In one or more particular examples, the bimodal oxide distribution may range from 0-90% of a first oxide type and 0-90% of a second oxide type (i.e., having differing sizes), and a remainder, red lead; and more preferably, a bimodal oxide distribution which may range from 20% to 50% of a first oxide type and 20% to 50% of a second oxide type, and a remainder red lead. Differences in particle sizes lead to a more efficient packing and may impart superior properties to the eventual active material. While various examples are described, one of skill in the art will appreciate modifications can be made for the intended purposes without departing from the overall scope of the present invention. Note, the current standard method in the art is to use either a thermal mill oxide with a particle size distribution (PSD) D50=>2.0 um, or an attrition mill oxide with PSD D50=>0.7. PSD may be measured by Helios laser particle size analyzer. These parameters are indicative only and dependent upon machine type and processing conditions. For example, various methods are known for making leady oxide, such as for example, Barton Pot method (thermal) and Ball Mill method (attrition). The particle size distribution of the oxide that results from the two processes may be different. For instance, a Barton Pot process may produce a peak D50 distribution at between 2.0 and 4.0 um (for example)(see FIG. 10), while Ball Mill oxide may have a D50 distribution between 0.7 um and 1.2 um (for example)(see FIG. 11).

In one example, the negative active material 130 or negative mass may also or alternatively be improved. For example the negative mass recipe may include an improved expander, or other alternatives which accomplish the foregoing objectives. In various examples, the negative mass may include one or more additives. In this regard, improved AGM battery charge acceptance of the negative plate 106 may be accomplished by using individually or in combination (e.g., as an addition to the negative paste 130 or included in the negative paste mass) one or more of the following:

One or more carbons (carbonaceous materials), such as but not limited to, high surface area conductive carbon black with specific properties for the intended purposes, and/or natural or synthetic graphite, and/or carbon nanotubes, and/or graphene, and/or activated carbon, and the like at dosing levels from 0.01 to 1.0 weight percent (wt %), and more preferably may be from 0.09 to 0.9 wt %; for example: dosing levels for some components, e.g., carbon nanotubes, are very low and may be from 0.01 to 0.1 wt %, while activated carbons and graphites may approach 1.0 wt % dosage level;

One or more organic expanders, such as but not limited to, dispersant-type materials, including for example, synthetic (e.g., naphthalene sulfonate condensate, phenolic sulfonate condensate molecules) and/or organic or non-synthetic materials derived from, for example wood chemicals (e.g., lignin, lignosulfonates, humates or humic acid (and ionic salts thereof, i.e., sodium lignosulfonate)), among others at dosing levels from 0.01 to 1.0 wt %, and more preferably may be from 0.1 to 0.5 wt %; and/or Barium sulfate, which may be fine particle size barium sulfate (e.g., 0.1 micron, 0.7 micron (um, μm)) at a wt % dosing level ranging from 0.5 to 2.0 wt %, and more preferably may range from 0.7 to 1.25 wt %, and even more preferably may range from 0.90 to 1.10 wt %.

Alternative negative mass recipes may also be provided which accomplish the objectives described herein.

Referring to the foregoing, carbon nanotubes and the like may maintain a conductive matrix in the active material, thereby improving performance, especially in regards to micro-cycling as used in micro-hybrid and start-stop applications. In other examples, surface oxidized graphite, as well as conductive carbon black with high surface area and high structure also provide improved performance. According to further examples of embodiments, one or more carbons may be combined (by weight percent) such as a conductive large particle carbon and a smaller particle carbon form (e.g., allotrope).

Advantageously, fine particle barium sulfate produces a greater number of small lead sulfate crystals during discharge. In turn, these small lead sulfate crystals dissolve easier during charge than large lead sulfate crystals, leading to an improvement in charge acceptance.

In additional to the foregoing, the negative plate 106 may also have the advantageous feature of resisting the buildup of dense passivating lead sulfate. For example, for the negative plate 106, the charge/discharge reaction involves the conversion of lead to lead sulfate (discharge) and the lead sulfate to lead (recharge). The process proceeds via a dissolution-precipitation mechanism. Components that influence either dissolution or precipitation can influence performance. For instance: (1) fine particle barium sulfate is believed to provide more nucleation sites for fine lead sulfate deposition and dissolution; (2) organic expanders are surface active molecules which impede the deposition of lead as a non-porous layer, the lead is deposited as high surface area sponge lead in the presence of organic expanders, i.e., organics prevent sintering of the lead electrode; (3) the carbon conductive network allows better utilization of the inner part of the active material, so reactions are not limited to the surface of the plate where mass transport is easiest. The foregoing assists in mitigation the lead-sulfate buildup on the surface of plates which prevents access to the interior of the active mass.

The negative plate 106 may also have the advantageous feature of, in one or more examples, maintaining functionality for the life of the battery 100. For instance, the negative plate 106 may have low gassing and low water consumption, enabling, for example, longer useful service life in a vehicle 102 during idle-stop-start operation. As a non-limiting example, the surface active properties of the components (e.g., barium sulfate, organic expander, and carbon additive) may change the electrochemical potential of the active material surface, thereby, changing the rate of fundamental reactions such as gas evolution. The additives may act to change the electrochemistry, changing the rate or potential at which gas is produced. Lead acid batteries produce gas on charging—hydrogen from the negative and oxygen from the positive—the rate of gas protection (and water loss) can be modified by the paste additives. Components with a high surface area can lower the current density, while carbons may have a capacitive effect, and organic materials may bind to surfaces preventing access to the surface and thus raising the potential at which gas is evolved.

Figure 12:
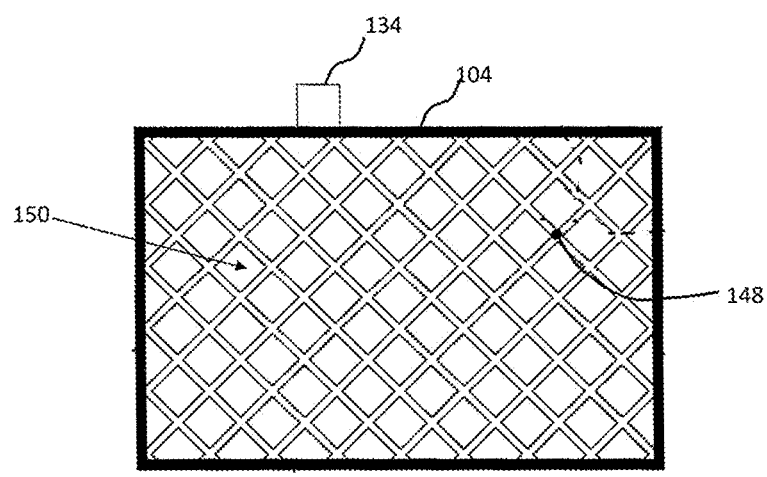
FIG. 12 is an elevation view of one or more examples of a plate having an imprint on the plate surface.

In addition to the foregoing, in one or more examples of embodiments, the pasted plates 104 and/or 106 (with or without surface scrim) may be imprinted, or have an imprint on the surface, to provide for example a plurality of grooves such as disclosed in United States Patent Publication No. 2015/0104715, the entire contents of which is hereby incorporated by reference in its entirety. As disclosed in said publication, the imprint or grooves may assist in electrolyte flow and air removal, among other benefits. In one or more examples, a "waffle" pattern surface treatment 150 of various grooves, such as shown in FIG. 12, may be provided on a plate surface 148, such as but not limited to, the positive plate 104. A plate surface treatment may also include a "riffle" pattern on the negative plate 106 (or in some embodiments the positive plate 104). In one or more examples, a pasting paper 132 may also be used, e.g. added to a plate 104, 106.

As indicated, separator material 108 may be provided between each positive plate 104 and negative plate 106. The separator 108 may be an absorbent glass mat or AGM, and in one or more examples of embodiments may be wrapped around a portion of, or interleaved with/provided between one (or both) of the positive and negative plates 104, 106. A single or double layer of AGM 108 may be employed. For example, a separator may be provided on the positive plate and an AGM 108 may also be employed with the positive/ negative plates. The absorbent glass mat 108 may be constructed similar to and/or of a similar material to a traditional absorbent glass mat separator, including thin glass fibers woven into a mat (or more commonly non-woven deposited fibers). However, variations thereon which accomplish the purposes disclosed herein may also be acceptable. In one or more examples of embodiments, a thin glass scrim or mat may be provided on the positive plate.

An electrolyte, which is typically sulfuric acid, may be included in the battery 100. In various examples, the electrolyte may include one or more metal ions. To this end, the sulfuric acid electrolyte may be a sulfuric acid solution including one or more metal sulfates. More specifically, in one example, a specific optimized combination of one or more of the following may be selected to accomplish the improved battery performance described herein: soluble metal sulfates from elements Al, Mg, Na, K, Li, Zn, and the like. The current standard in industry is a Na at 10-15 g/liter. The electrolyte described herein preferably may have a combination of one or more of the following: Mg, Mg+Na, Al, Al+Na, and/or Zn, Zn+Na, ranging from 0 g/liter to 10 g/liter for each, with a total not greater than 15 g/liter. Generally, the mechanism used is the common ion effect (e.g., sulfate is common). This impedes or permits the dissolution of lead sulfate during charge, depending on the amount of the salt already in the electrolyte. A secondary mechanism may also be employed in which the metal ion is deposited onto the negative electrode surface where it acts to change the electrochemical potential. The ability to accept charge is enhanced, and in some examples is enhanced by about 50% above a standard battery. While specific examples are discussed above, variations thereon may also be acceptable for the purposes provided.

In one or more alternative examples of embodiments, various additional/alternative elements of the AGM lead-acid battery may be improved or changed to achieve the desired performance, including but not limited to changes in separator composition, changes in polymer for the battery container 114, and/or other new or alternative components.

Accordingly, a battery 100 as described in one or more examples of embodiments herein includes a novel negative paste recipe and/or paste components, additives to electrolyte, a scrim surface pattern, and radial, fully framed positive and negative grids of the types described herein. In some examples of embodiments, the foregoing is used in association with an absorbent glass mat. However, it is contemplated that a lead acid battery having one or more of the foregoing components may be provided without an absorbent glass mat, and instead with a separator.

More specifically, a lead-acid storage battery 100 is disclosed. The battery includes a container with a cover. The container includes one or more compartments. One or more cell elements are provided in the one or more compartments, the one or more cell elements include a positive plate, the positive plate having a positive grid and a positive electro- chemically active material on the positive grid; a negative plate, the negative plate having a negative grid and a negative electrochemically active material on the negative grid, wherein the negative electrochemically active material comprises fine particle barium sulfate and an organic expander; and a separator between the positive plate and the negative plate. An electrolyte is provided within the container. One or more terminal posts extend from the container or the cover and electrically are coupled to the one or more cell elements. In some examples of embodiments, an absorbent glass mat may be provided in addition to the separator or in place of the separator. A scrim may also be provided, as well as an imprinted pattern on a plate and/or scrim surface. In some examples of embodiments, a carbon may also be provided in the negative electrochemically active material. A bimodal particle distribution of oxide may also be provide in the active material, such as on the positive plate.

According to one or more examples of embodiments, a battery 100 is disclosed herein, which as a result of one or more of the features described, may have endurance (e.g., cycling, water consumption, service life under the hood, and maintained start-stop functionality). The battery 100 may also have high charge acceptance, which may be dynamic and/or static charge acceptance, as well as at partially charged states. The battery 100 may also have high current performance, which may be maintained for engine starting, including cold starts and warm starts. The battery 100 may further have high current performance, which may be beneficial for, among other things, power assist on launch of a vehicle 102. The battery 100 may also have high capacity, which may be useful for, among other things, maintaining vehicle 102 systems during a stop event in a start-stop operation (e.g., for lighting, AC, onboard computers, and other vehicle systems).

Advantageously, a battery 100 having the features described herein has improved performance, and provides sustainable and fast re-chargeability and consistent cycling performance over time. The active material composition or recipe provides a changed, or improved, charge acceptance performance and/or efficiency (e.g., dynamic charge acceptance) over existing AGM batteries. Thus, a battery 100 having one or more of the features described herein may be capable of delivering enhanced charge acceptance when operated in a partially discharged state, suitable for start-stop operation. The battery 100 having one or more of the features described herein may also provide enhanced dynamic charge acceptance suitable for use in regenerative braking, as well as start-stop operation. The battery 100 may also have high partial state of charge cycling performance (endurance) capable of maintaining start-stop functionality of a vehicle 102 for a significantly longer life than conventional batteries. The battery 100 may also have good cold cranking capacity and under the hood life, as well as enhanced ISS (Idle Start Stop) performance.

EXAMPLES

The following Examples are an illustration of one or more examples of embodiments of carrying out the invention and are not intended as to limit the scope of the invention.

Example 1

In one or more examples of embodiments, charge acceptance, and in particular, dynamic charge acceptance, of the battery 100 described herein was compared relative to various industry standards. A number of batteries were assembled including the various components described herein. In particular, in the illustrated example, the particular batteries tested against various industry standard examples included plates, such as negative plates, with a fine particle barium sulfate, an organic expander, and a conductive carbon. The plates of the sampled batteries, both positive and negative, also included PowerFrame® grids available from Johnson Controls, PLC (Milwaukee, Wis.), a scrim, and a surface treatment on the plate.

Figure 13:
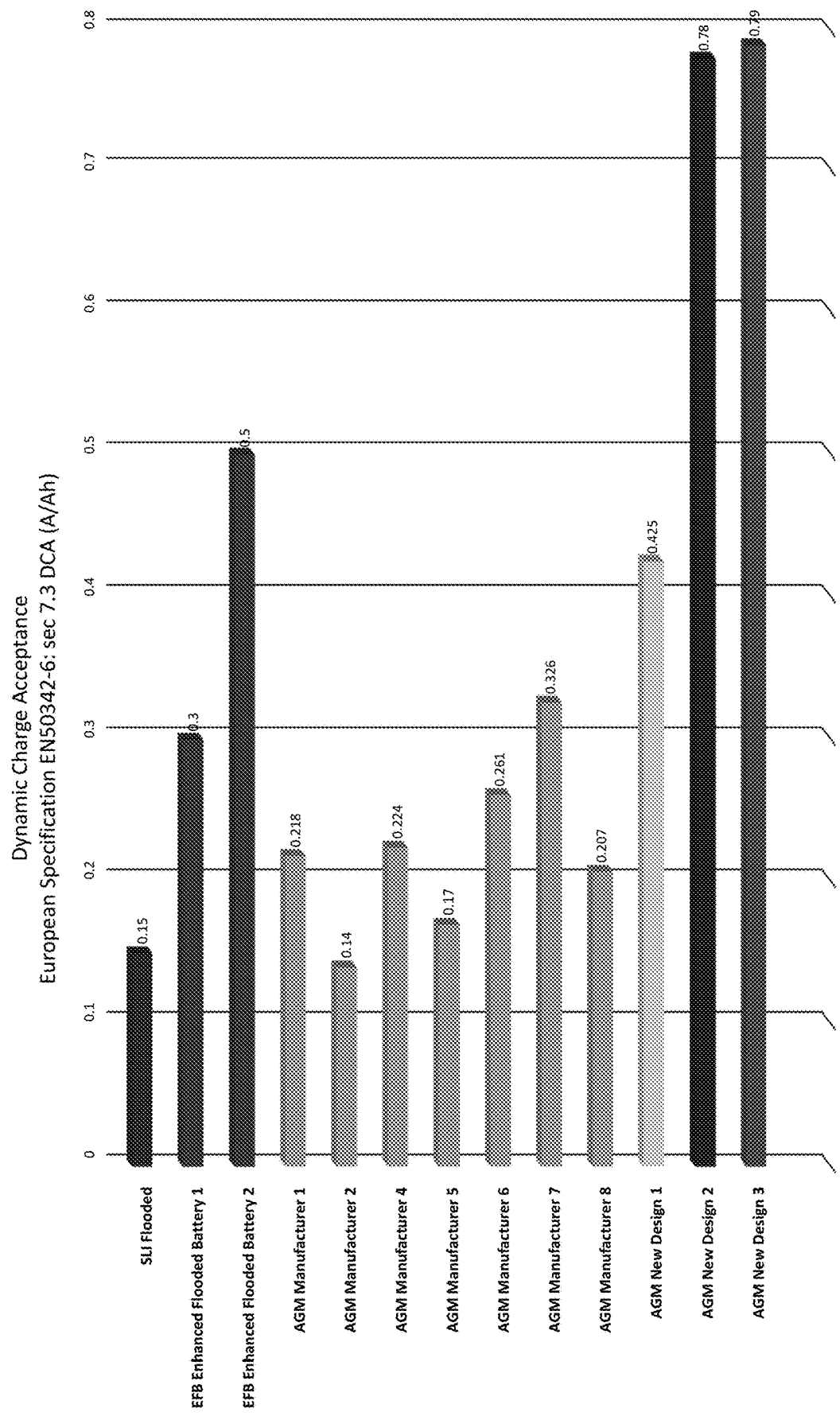
FIG. 13 is a graph showing performance data, namely, dynamic charge acceptance, of a battery of the type described herein compared to existing batteries.

As can be seen in FIG. 13, which illustrates a Dynamic Charge Acceptance Test (DCA) performed according to industry standard, the battery 100 described herein performed significantly better than the various example standard batteries. As can be seen, the test results show batteries with a DCA greater than 0.6 A/Ahr and in several instances greater than 0.7 A/Ahr. These results show performance ranging from 2 to 5 times a standard battery, and may range from 2 to 3 times an industry average for dynamic charge acceptance.

While specific examples are shown, one of skill in the art will recognize that these are examples only and variations thereon may be made without departing from the overall scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

The invention claimed is:

1. A lead-acid storage battery comprising:
a container with a cover, the container including one or more compartments;
one or more cell elements in the one or more compartments, the one or more cell elements comprising:
a positive plate, the positive plate having a positive grid and a positive electrochemically active material on the positive grid;
a negative plate, the negative plate having a negative grid and a negative electrochemically active material on the negative grid made out of a lead oxide paste spread, wherein the negative electrochemically active material comprises conductive carbon, 0.5 to 2.0 wt % fine particle size barium sulfate, and 0.01 to 1.0 wt % of an organic expander, wherein the conductive carbon is provided in the negative electrochemically active material at a percent by weight of activated carbons and graphites approaching 1.0 wt % percent, and includes 0.01 to 0.1 percent by weight carbon nanotubes; and
an absorbent glass mat separator between the positive plate and the negative plate;
electrolyte within the container; and
one or more terminal posts extending from the container or the cover and electrically coupled to the one or more cell elements.

2. The lead-acid storage battery of claim 1, wherein the conductive carbon of the negative electrochemically active material further comprises one or more carbons selected from the group consisting of high surface area conductive carbon black, natural or synthetic graphite, and graphene at dosage levels of 0.01 to 1.0 wt %.

3. The lead-acid storage battery of claim 1, wherein the electrolyte comprises a sulfuric acid solution including one or more metal sulfates, wherein the metal sulfates are soluble metal sulfates selected from the group consisting of the elements Al, Mg, Na, K, Li, and Zn.

4. The lead-acid storage battery of claim 1, wherein at least one of the positive electrochemically active material and the negative electrochemically active material has a bimodal particle size distribution of lead oxide, wherein the bimodal particle size distribution ranges from 20% to 50% of a first oxide type and 20% to 50% of a second oxide type, the remainder being red lead.

5. The lead-acid storage battery of claim 1, wherein the organic expander is a naphthalene sulfonate.

6. The lead-acid storage battery of claim 1, further comprising an additional separator between the positive plate and the negative plate.

7. The lead-acid storage battery of claim 1, further comprising a pasting paper.

8. The lead-acid storage battery of claim 1, wherein the organic expander is a wood chemical.

9. A lead-acid storage battery comprising:
a container with a cover, the container including one or more compartments;
one or more cell elements in the one or more compartments, the one or more cell elements comprising:
a positive plate, the positive plate having a positive grid and a positive electrochemically active material on the positive grid;
a negative plate, the negative plate having a negative grid and a negative electrochemically active material on the negative grid made out of a lead oxide paste spread, wherein the negative electrochemically active material comprises conductive carbon, 0.5 to 2.0 wt % line particle size barium sulfate, and 0.01 to 1.0 wt % of an organic expander, wherein the conductive carbon is provided in the negative electrochemically active material at a percent by weight of activated carbons and graphites approaching 1.0 wt % percent, and includes 0.01 to 0.1 percent by weight carbon nanotubes; and
a separator between the positive plate and the negative plate electrolyte within the container; and
one or more terminal posts extending from the container or the cover and electrically coupled to the one or more cell elements.

10. The lead-acid storage battery of claim 9, wherein the conductive carbon of the negative electrochemically active material further comprises one or more carbons selected from the group consisting of high surface area conductive carbon black, natural or synthetic graphite, graphene, and activated carbon.

11. The lead-acid storage battery of claim 9, wherein the electrolyte comprises a sulfuric acid solution including one or more metal sulfates, wherein the metal sulfates are soluble metal sulfates selected from the group consisting of the elements Al, Mg, Na, K, Li, and Zn.

12. The lead-acid storage battery of claim 9, wherein at least one of the positive electrochemically active material and the negative electrochemically active material has a bimodal particle size distribution of oxide.

13. The lead-acid storage battery of claim 9, wherein the organic expander is a wood chemical.

14. The lead-acid storage battery of claim 9, wherein the organic expander is a naphthalene sulfonate.

15. The lead-acid storage battery of claim 9, further comprising an additional separator between the positive plate and the negative plate.

16. The lead-acid storage battery of claim 9, further comprising a pasting paper.

17. A lead-acid storage battery comprising;
a container with a cover, the container including one or more compartments;
one or more cell elements in the one or more compartments, the one or more cell elements comprising:
a positive plate, the positive plate having a positive grid and a positive electrochemically active material on the positive grid;
a negative plate, the negative plate having a negative grid and a negative electrochemically active material on the negative grid made out of a lead oxide paste spread;
wherein the negative electrochemically active material comprises one or more conductive carbons, 0.5 to 2.0 wt % fine particle size barium sulfate, and one or more organic expanders, wherein the conductive carbons are provided in the negative electrochemically active material at a percent by weight approaching 1.0 percent, and includes 0.01 to 0.1 percent by weight carbon nanotubes; and
an absorbent glass mat separator between the positive plate and the negative plate;
electrolyte within the container, wherein the electrolyte comprises a sulfuric acid solution including one or more metal sulfates, wherein the metal sulfates are soluble metal sulfates selected from the group consisting of the elements Al, Mg, Na, K, Li, and Zn; and
one or more terminal posts extending from the container or the cover and electrically coupled to the one or more cell elements.

18. The lead-acid battery of claim 17, wherein the one or more conductive carbons further include carbons selected from the group consisting of high surface area conductive carbon black, natural or synthetic graphite, graphene, and activated carbon.

19. The lead-acid storage battery of claim 17, wherein at least one of the positive electrochemically active material and the negative electrochemically active material has a bimodal particle size distribution of oxide.

20. The lead-acid storage battery of claim 17, wherein the organic expander is a naphthalene sulfonate.

* * * * *

UNITED STATES PATENT AND TRADEMARK OFFICE
CERTIFICATE OF CORRECTION

PATENT NO. : 11,411,280 B2
APPLICATION NO. : 16/620299
DATED : August 9, 2022
INVENTOR(S) : Frank-Thomas Johns et al.

It is certified that error appears in the above-identified patent and that said Letters Patent is hereby corrected as shown below:

On the Title Page

1. In Item (56), under "OTHER PUBLICATIONS", in Column 2, Line 1, delete ""CyclicVoltammetric Studies of theBehavior" and insert -- "Cyclic Voltammetric Studies of the Behavior --, therefor.

2. In Item (56), under "OTHER PUBLICATIONS", in Column 2, Line 3, delete "vol. 22 No. 6," and insert -- vol. 22, No. 6, --, therefor.

In the Specification

3. In Column 1, Line 41, delete "to" and insert -- with --, therefor.

4. In Column 7, Line 19, delete "(for example)(see FIG. 10)," and insert -- (for example) (see FIG. 10), --, therefor.

5. In Column 7, Line 21, delete "(for example)(see FIG. 11)." and insert -- (for example) (see FIG. 11). --, therefor.

6. In Column 8, Line 11, delete "additional" and insert -- addition --, therefor.

7. In Column 8, Line 30, delete "the" and insert -- of the --, therefor.

8. In Column 10, Line 17, delete "provide" and insert -- provided --, therefor.

9. In Column 12, Line 1, delete "show as" and insert -- shown as --, therefor.

In the Claims

10. In Column 13, Line 2, in Claim 3, delete "AI," and insert -- Al, --, therefor.

Signed and Sealed this
Ninth Day of April, 2024

Katherine Kelly Vidal
*Director of the United States Patent and Trademark Office*

CERTIFICATE OF CORRECTION (continued)
U.S. Pat. No. 11,411,280 B2

11. In Column 13, Line 33, in Claim 9, delete "line" and insert -- fine --, therefor.

12. In Column 13, Line 41, in Claim 9, delete "plate" and insert -- plate; --, therefor.

13. In Column 13, Line 41, in Claim 9, delete "electrolyte within the container; and" and insert the same at Line 42, as a new subpoint.

14. In Column 14, Line 13, in Claim 17, delete "comprising;" and insert -- comprising: --, therefor.